United States Patent [19]

Hörler et al.

[11] 4,373,336

[45] Feb. 15, 1983

[54] INTERNAL COMBUSTION ENGINE HAVING A TURBO-SUPERCHARGER WITH AN AUTOMATIC BYPASS

[75] Inventors: Hansulrich Hörler, Zurich; Erwin Meier, Remetschwil, both of Switzerland

[73] Assignee: BBC Brown, Boveri & Company, Limited, Baden, Switzerland

[21] Appl. No.: 105,774

[22] Filed: Dec. 20, 1979

[30] Foreign Application Priority Data

Jan. 31, 1979 [CH] Switzerland ............................ 923/79

[51] Int. Cl.³ ............................................ F02B 37/00
[52] U.S. Cl. ............................................ 60/606; 60/605
[58] Field of Search ................................ 60/605, 606

[56] References Cited

U.S. PATENT DOCUMENTS 2,654,991 10/1953 Nettel ............................... 60/606 X
3,232,044 2/1966 Gratzmuller ...................... 60/606 X
3,988,894 11/1976 Melchior .............................. 60/606

FOREIGN PATENT DOCUMENTS

2284040 4/1976 France ................................. 60/606

*Primary Examiner*—Michael Koozo
*Attorney, Agent, or Firm*—Burns, Doane, Swecker & Mathis

[57] ABSTRACT

An internal combustion engine has a turbo-supercharger connected to an engine charge air intake manifold and an exhaust gas turbine connected to an engine exhaust manifold. An automatic bypass includes a bypass line interconnecting the exhaust manifold upstream of the exhaust gas turbine and the air intake manifold downstream of the compressor. A bypass valve in the bypass line comprising an adjustable throttle member for adapting the quantity of bypassed gas to the respective operating state of the engine. An actuating piston closes the throttle member in response to pressures from the compressor side above a pre-selected value. The actuating piston is disposed on a side of the throttle member facing away from the air intake manifold. The resistance of the valve to flow from the compressor side to the turbine side is less than the resistance in the opposite direction. The resistance to flow, and the fully unseated valve position define an operating curve of the engine which is adjustable. The throttle member can close before the maximum engine output point is reached.

2 Claims, 27 Drawing Figures

INTERNAL COMBUSTION ENGINE HAVING A TURBO-SUPERCHARGER WITH AN AUTOMATIC BYPASS

BACKGROUND AND OBJECTS OF THE INVENTION

The present invention relates to an internal combustion engine comprising a turbo-supercharger with an automatic bypass.

In the case of volumetric internal combustion engines, such as four stroke and two stroke engines with series-connected piston superchargers, difficulties arise when operating under partial load at high boosting, because the engine suffers from a deficiency of air, and the compressor surges. This problem will become especially acute with high supercharger compression ratios, exceeding about 3.5, which are expected in the future in marine engines having fixed pitch propeller operation. In such an engine there is no way to adapt the engine rotational speed, and thus the compressor rotational speed, to the compressor characteristics by adjusting the propeller pitch.

This deficiency can be overcome in the case of turbo-superchargers in a known manner by means of a bypass, through which the compressor outlet can be connected to the turbine inlet when output is reduced. At higher output it remains closed, except for short duration in special cases, e.g., in the case of hydrofoil boats during displacement travel just before emerging from the water, when because of the high resistance to travel, the engine rotational speed is further reduced.

The action of such a bypass has been known for some time, but in the case of marine engines with fixed pitch propellers, it has, up to the present time, neither been proposed nor used, mainly because of the previous low full load supercharger compression ratios and poor turbo-supercharger efficiencies. In the case of vehicle engines, it has only been used previously in combination with ancillary equipment, such as auxiliary combustion chambers for the turbo-supercharger, auxiliary blowers for the bypass, etc. However, these systems are complicated, so that in practice they are seldom used at the present time.

The before-mentioned high supercharger compression ratio of over 3.5 already exists, particularly in the case of middle-fast four stroke diesel engines, which are increasingly protruding into the output range of large two stroke engines.

In fixed pitch propeller operation, which is characterized by $M \sim n^2$, or more characteristically where the torque remains partially constant as the rotational speed is reduced, such as in the case of vehicles, constructional machinery, etc., the following three problems occur in the partial output region in volumetric engines having normal supercharger systems without bypass:

(1) When the charge air pressure falls sharply, particularly in the case of constant pressure operation, the engine suffers a deficiency of air, smokes, accelerates badly and the exhaust gas temperature is higher than when under full load.

(2) In order to keep the engine operating line sufficiently far away from the compressor surge limit, the full output point becomes situated in the poor efficiency region, particularly in the case of impulse operation. Then, in the case of rapid fall-off in load, or bypassing or hot water feed to the charge air cooler in order to guarantee spontaneous ignition, the surge limit is nevertheless reached under partial output.

(3) In order for the peak pressure in the cylinder not to become too high, the compressor ratio must, under certain circumstances, be reduced, and this leads to ignition difficulties under small partial loading when starting-up. The known aid method involving preheating of the charge air leads, as stated, to the danger of surging and smoking.

As already stated, in addition to the problematic solution using adjustable turbine and compressor blades, these difficulties can be avoided or at least made less severe by providing between the compressor outlet and turbine inlet an adjustable bypass. However, the known types still always comprise an auxiliary combustion chamber for accelerating the turbo-supercharger independently of the engine, and possibly an auxiliary blower.

These present day known types of supercharger systems incorporating a bypass suffer, among other reasons, from the afore-described complicated construction comprising the auxiliary combustion chamber, auxiliary blower, etc., and this also undermines operational reliability, and the constructional cost becomes considerable. In addition, these systems require additional energy, and this reduces their efficiency.

In most known designs, there is also no possibility of easy adaptation to different engines and operating conditions. Moreover, often costly modification work such as replacing cam plates, etc., is necessary to do this. Furthermore, it is not possible to maintain the throttle member in the bypass temporarily open by external means as is necessary in special cases. Such a case, known as special operation, occurs momentarily when a second slower propeller curve exists, as in the case of hydrofoil boats before emerging from their displacement travel.

Therefore, it is an object of the present invention to provide a turbo-supercharger with an automatically controlled bypass, which is constructionally simpler than known designs, and which substantially obviates their drawbacks.

Another object is to enable required operational behavior to be easily set.

A further object is to make use of the rapid pressure and impulse operation.

An additional object is to enable the bypass, if required, to act as a non-return valve.

A further object of the present invention is to minimize leakages which have been heretofore unavoidable in the usual piston-controlled valves.

Another object is to enable the non-return valve to act simultaneously as a throttle member for simplification reasons.

SUMMARY OF THE INVENTION

These objects are achieved by the present invention involving an internal combustion engine of the type having a turbosupercharger connected to an engine charge air intake manifold and an exhaust gas turbine connected to an engine exhaust manifold. An automatic bypass includes a bypass line interconnecting, firstly, the exhaust manifold upstream of the exhaust gas turbine and, secondly, the air intake manifold downstream of said compressor. Bypass valve means is disposed in the bypass line and comprises an adjustable throttle member for adapting the quantity of bypassed gas to the respective operating state of the engine. An actuating piston is operably connected to the throttle member and is responsive to pressures occurring in the bypass line to close the throttle member in response to pressures from the compressor side above a pre-selected value. The resistance to flow and the fully unseated valve position established by the first and second means define an operating curve of the engine having a throttle open point defined by the second means, a throttle closed point defined by the first means, and a maximum engine output point. The actuating piston is disposed on a side of the throttle member facing away from the air intake manifold. A first means acts on the bypass valve means to impose thereon a resistance to gas flow. The resistance to flow from the compressor side to the turbine side is less than the resistance to flow from the turbine side to the compressor side. A second means defines a fully unseated location of the throttle member. The first and second means are adjustable to vary the operating line. The first means enables the throttle member to close before the maximum engine output point is reached.

THE DRAWING

A detailed description is given hereinafter of preferred embodiments of the invention with reference to the accompanying drawing, wherein.

DETAILED DESCRIPTION OF A PREFERRED EMBODIMENT OF THE INVENTION

Figure 1:
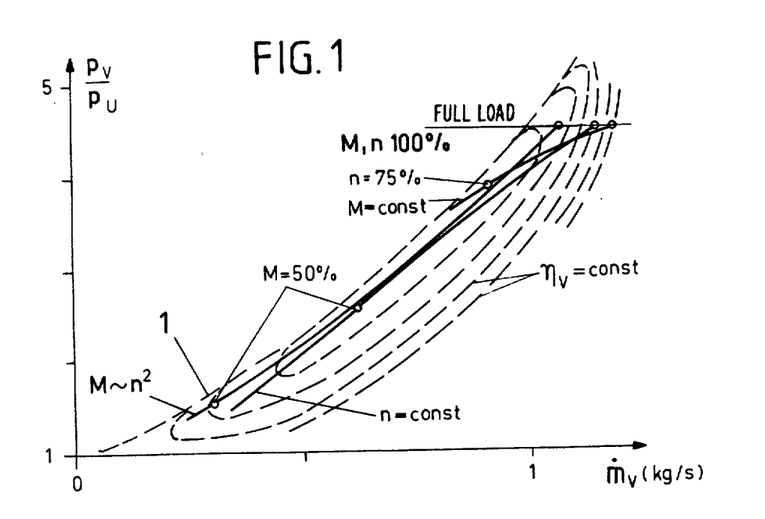
FIG. 1 is a graph showing typical compressor characteristics, with three operational cases being indicated.

In the diagram of FIG. 1, the dashed line 1 represents the surge limit in the compressor characteristic curves of a typical turbo-supercharger for internal combustion engines of the type concerned here. The diagram also contains a fixed pitch propeller curve $M \sim n^2$, the curves for n=constant, M=constant, the full load points for the torque M and the rotational speed n, and the partial load points for M=50% and n=75% of the full load values, for operation without a bypass.

Figure 2:
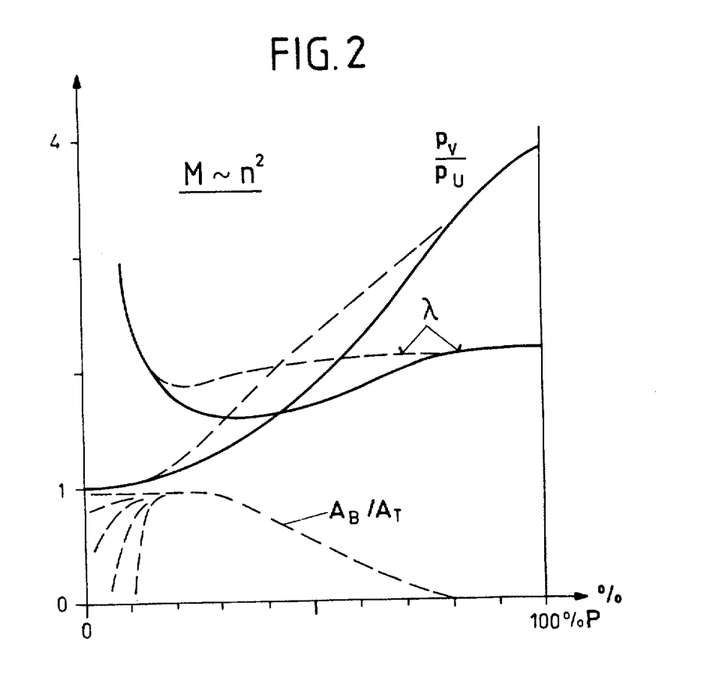
FIG. 2 is a diagram of the operational behavior of a four stroke engine in constant pressure operation for driving a fixed pitch propeller, with and without a controlled bypass.

FIG. 2 shows for fixed pitch propeller operation $M \sim n^2$ the compressor pressure ratio $p_v/p_u$, the combustion air ratio λ, and the ratio $A_B/A_T$ as a function of the engine output P, $A_B$ and $A_T$ being the equivalent passage areas of the bypass and turbine. For $p_v/p_u$ and λ, the full lines are for a turbo-supercharger without a bypass, and the dashed lines are for a turbo-supercharger with a controlled bypass according to the present invention. It can be seen that with the controlled bypass, the compressor end pressure and the fed air weight in the practically important region of the partial output are considerably higher than without the bypass. The curve $A_B/A_T$ shows for example that for 50% of rated output, $A_B/A_T=0.5$. The diagram also shows the variation of the relative bypass opening $A_B/A_T$ with output.

Figure 3:
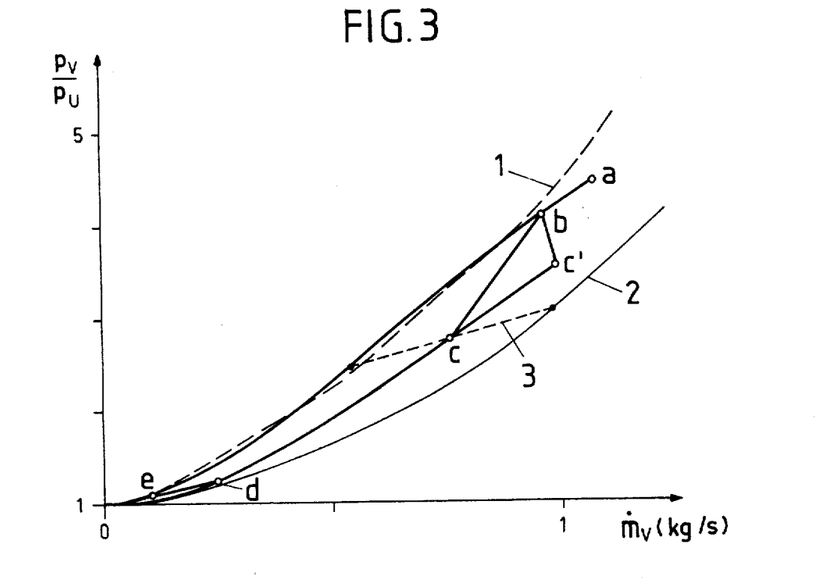
FIG. 3 shows compressor characteristics with operating lines for a controlled bypass, for a four-stroke engine with constant pressure operation for driving a fixed pitch propeller.

FIG. 3 illustrates the compressor characteristics i.e., the relationship between the pressure ratio $p_v/p_u$ and the compressor air flow $m_v$, with engine operating lines for fixed pitch propeller operation. With the bypass closed, i.e., the extent of valve unseating h=0, the operating line extends in the region of the surge limit 1, the full output point being indicated by a. The curve portion e,d,c,b,a illustrates the operating line for bypass operation with the present device. In the range below e the bypass is closed, and represents the lower partial opening region. In the range dc the bypass operates with fixed opening, and in the upper partial opening region cb the bypass becomes gradually closed, and from b to a it is practically closed. The operating line extending between points b to a closed bypass. The portion bc' is valid for constant $p_T/p_u$ where $p_T$ is the turbine inlet pressure. In the following diagram shown in FIG. 4, which shows the compressor pressure ratio as a function of the turbine pressure ratio, this then appears as the portion bc' parallel to the ordinate.

Figure 4:
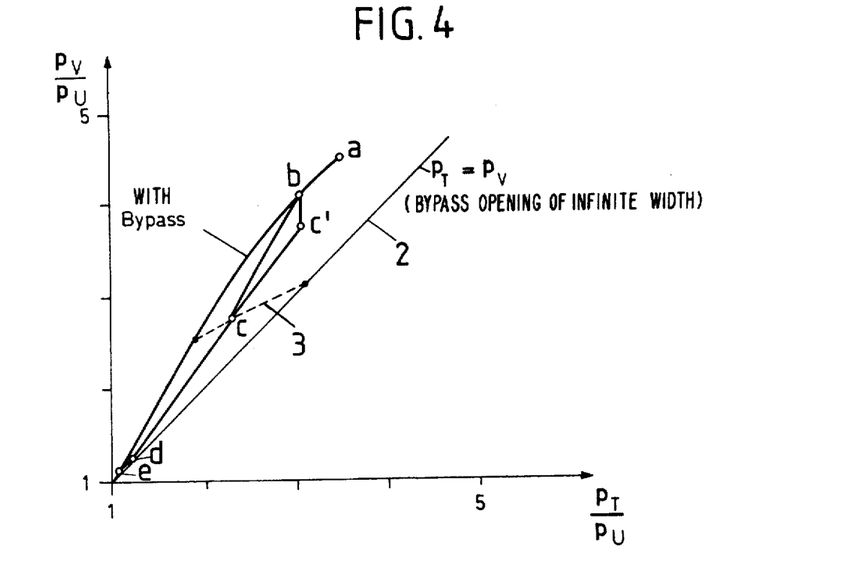
FIG. 4 is a diagram showing the relation between the compressor end pressure and turbine inlet pressure, with operating lines for a controlled bypass, for a four-stroke engine with constant pressure operation for driving a fixed pitch propeller.

The operating lines shown in FIG. 4 correspond to those of FIG. 3. The narrowly dashed line 3 through point c joins together constant engine operating points for different degrees of bypass opening.

The diagrams of FIGS. 2, 3 and 4 give the following conditions to be fulfilled for the operation of the bypass: For full output, because of the high efficiency the bypass is to be kept substantially closed. Portion ba or ab, if going from the full output point a.

If the turbine inlet pressure $p_T$ falls, the bypass throttle area $A_B$ must be continuously increased to a maximum ... bc. This area can be maintained either as far as point d or down as far as no-load running. In the case of very small output, something under 15% of full output, it can also be taken back to zero, and the curve portion de corresponds to this. In this no-load range, both modifications are practically equal, as the engine operates there as a suction engine. In this no-load range, the second modification can be more advantageous in the case of engines with a large scavenging of the clearance space. With an operating line which extends in such a manner, the required rise in the air charge pressure for partial output is attained, and prevents surging of the compressor.

In order to obtain the required operating line for a motor working in cooperation with the turbo-supercharger for the lowest possible expense, the position of the curve portions bc, cd and possibly also de should be able to be influenced by control means operable externally, e.g., adjustment screws, without which a complicated type of arrangement becomes necessary.

Further adaptation requirements which are fulfilled by the present bypass control system have already been described in the introduction.

Figure 5:
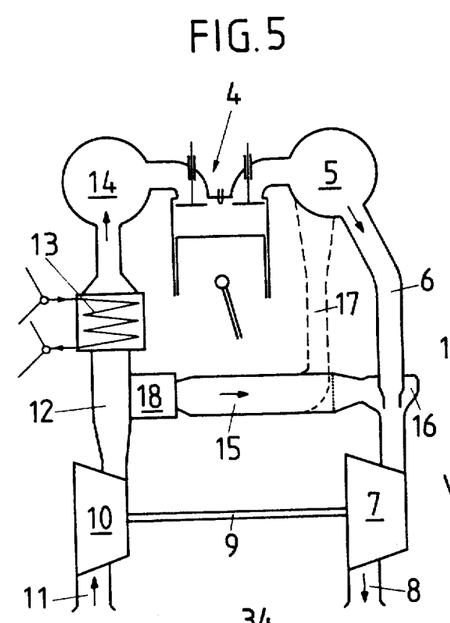
FIG. 5 is a diagrammatic illustration of a four-stroke engine with turbo-supercharger for constant pressure operation and with a controlled bypass in accordance with the invention.

FIG. 5 is a diagrammatic illustration of an internal combustion engine comprising a turbo-supercharger according to the invention for constant pressure operation. The exhaust gas from the engine 4 reaches an exhaust gas receiver 5, and from there passes through an exhaust line 6 into the turbine 7, leaving the latter through an offgas line 8. By means of the shaft 9, the turbine 7 drives a compressor 10 which draws combustion air through an intake line 11, compresses the air and forces the compressed air through the air intake manifold 12, through an air charger cooler 13 and into an air receiver 14, from which it reaches the engine 4. The latter is a highly supercharged, volumetric internal combustion engine, i.e., a four-stroke or two-stroke with a volumetric auxiliary compressor disposed in series.

A bypass line 15 branches from the air intake manifold 12, and flows either into the exhaust line 6 by way of an annular inlet funnel 16, or into the gas receiver 5 by way of an upwardly bent line 17 indicated by dashed lines. The diameter and length of the bypass line are made large enough to prevent the hot exhaust gas from penetrating into a control block 18 as a result of pulsations.

The exhaust pipe 6 is formed, within the inlet funnel 16, as an injector nozzle, in order to produce improved bypass flow by a suction action.

In this embodiment, a bypass valve is combined with a non-return valve and incorporated in the control block 18.

The throttle member of the automatic bypass itself is advantageously suitable as a slow-acting non-return valve, which is characterized by a large lift and large masses, and the impact of which has to be braked.

The operation and internal construction of such a control block are described hereinafter.

Figures 6, 6A:
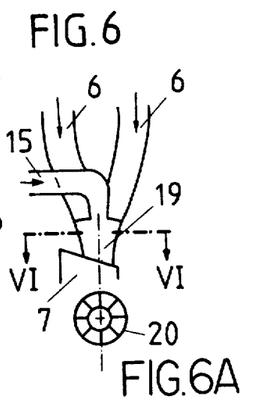
FIG. 6 is an exhaust manifold for multi-impulse operation with central entry of the bypass line.
FIG. 6A is a cross-sectional view taken along VI—VI of FIG. 6.

FIG. 6 shows a modification in which the entry of the bypass line 15 projects into an exhaust manifold 19 for multi-impulse or multi-stroke operation, in which several exhaust pipes 6 come directly from the individual cylinders or cylinder groups without a receiver being connected therebetween. Before entry into the turbine 7, the exhaust manifold 19 is in the form of a uniformly divided nozzle scroll 20, as shown in FIG. 6A.

Figure 7:
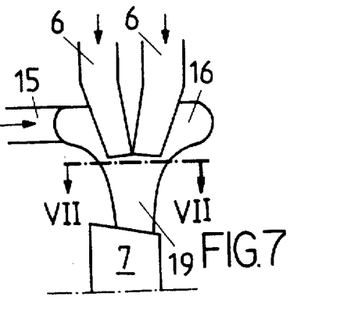
FIG. 7 is an exhaust manifold for multi-impulse operation with annular entry of the bypass line into the exhaust manifold.

FIG. 7 shows a further embodiment of the bypass entry into the exhaust manifold for multi-impulse operation, wherein the bypass line 15 transfers into an inlet funnel 16 surrounding the exhaust lines 6 in an annular manner.

Figure 7A:
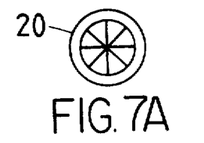
FIG. 7A is a cross-sectional view taken along line VII—VII in FIG. 7.

FIG. 7A indicates the form of the exhaust manifold as it goes into the turbine, namely, as a nozzle scroll 20.

Figure 8:
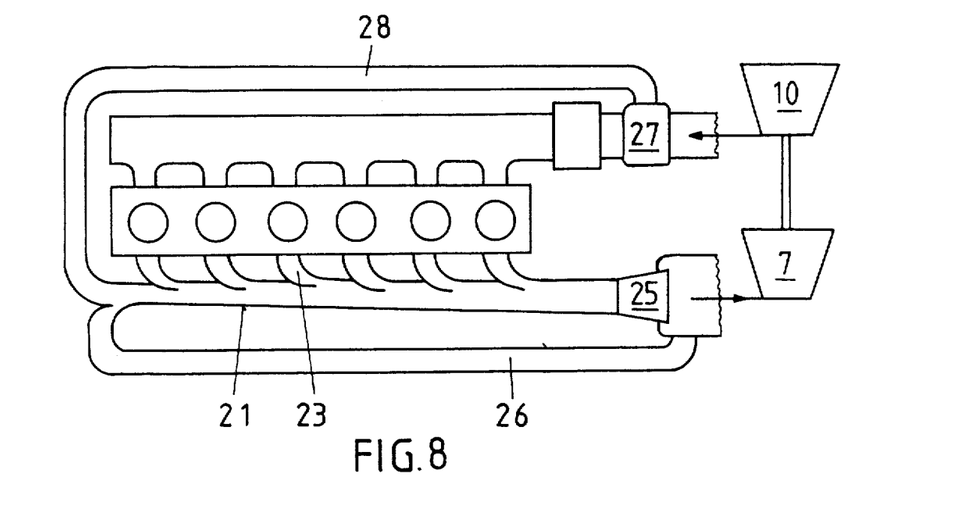
FIG. 8 is a diagrammatic illustration of an in-line engine with a turbo-supercharger for approximately constant pressure before the turbine with a bypass and an exhaust system, which is designed for good utilization of the energy of the exhaust pulses.
Figure 9:
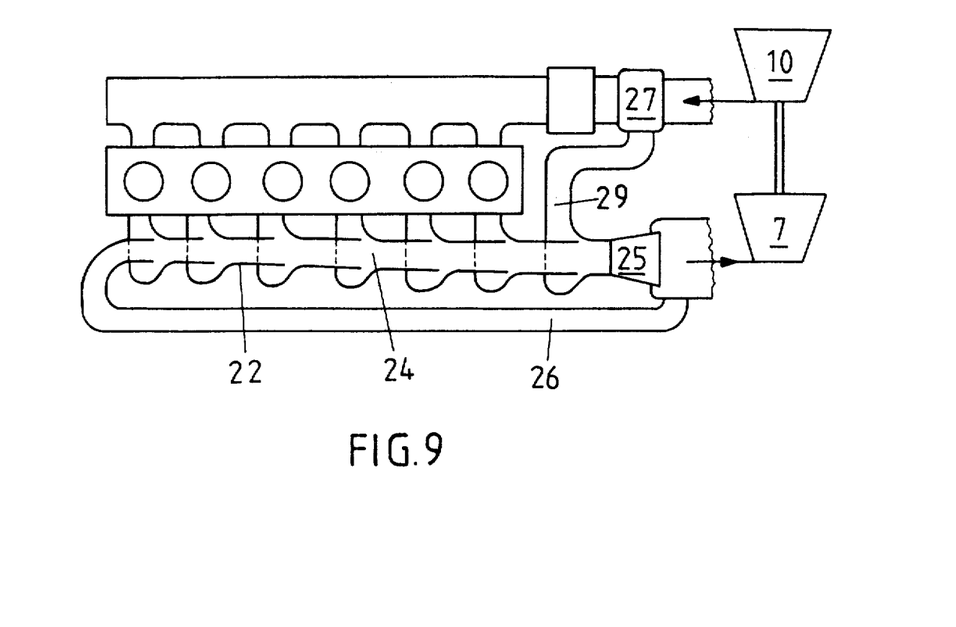
FIG. 9 is a diagrammatic illustration of an in-line motor with a bypass, and a further embodiment of such an exhaust system.

FIGS. 8 and 9 are diagrammatic illustrations of in-line engines with an exhaust system, which utilizes the energy of the periodical exhaust pulses in order to produce an approximately constant exhaust gas pressure at the inlet to the turbine 7, which pressure is higher than the pressure in an exhaust line 21 or 22. In the embodiment shown in FIG. 8, the exhaust pipes 23 from the individual cylinders are in the form of tangential injector nozzles which open into the exhaust line 21, whereas the exhaust pipes 24 in the embodiment of FIG. 9 are in the form of annular injector nozzles. In this manner, the energy of the exhaust pulses is transformed into velocity energy. The impulse of the periodical flow in these injector nozzles is transferred to the more uniform flow in the respective exhaust line 21, 22, in which a higher velocity and a lower pressure are present than downstream of the diffuser 25 before entry into the turbine 7.

In order to produce a more uniform flow in the exhaust line 21 or 22 and an approximately equal pressure for all cylinders, the cross-section of exhaust line 21 or 22 can increase in the flow direction, as shown in particular in FIG. 8. Also, part of the exhaust gas between the diffuser 25 and turbine 7 can be deviated into a return line 26 and returned therethrough to the beginning of the exhaust line 21.

In FIGS. 8 and 9, the bypass valves are indicated by 27 and the bypass lines are indicated by 28 and 29, respectively. The bypass lines communicate preferably with a point in the exhaust lines 21 and 22 at which the lowest possible pressure is present, so that even for a small pressure difference $p_V$-$p_{Ta}$ sufficient air quantity is still conveyed through the bypass. In the embodiment shown in FIG. 8, the bypass line 28 opens into the beginning of the exhaust line 21, whereas in the embodiment shown in FIG. 9 the bypass line 29 passes into the exhaust line 22 upstream of the diffuser 25. The FIG. 8 embodiment provides a more uniform flow in the exhaust line 22 and thus a more balanced exhaust work and scavenging of the individual cylinders. The FIG. 9 embodiment provides a shorter bypass line 29 with a resulting lower energy loss. Of course, the exhaust system of FIG. 8 can be combined with the bypass line of FIG. 9 and vice versa.

Figure 10:
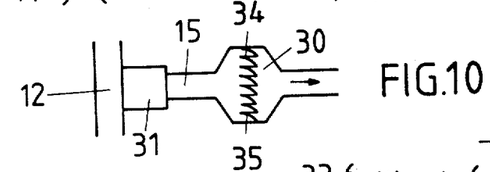
FIG. 10 is an automatic bypass with a separate rapid-acting non-return valve.
Figure 11:
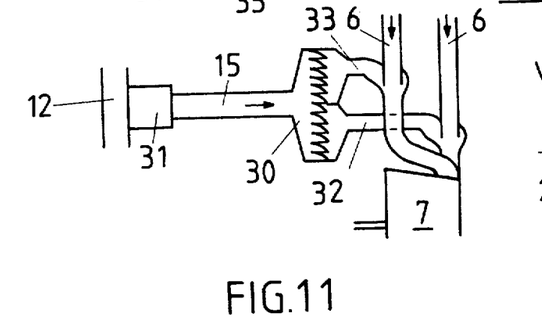
FIG. 11 is an automatic bypass with two separate rapid-acting non-return valves and two gas inlets for impulse operation.

In a bypass shown in FIG. 10, a rapid-acting non-return valve 30 is constructionally separate from a bypass valve 31 and is disposed in the bypass line 15. A similar embodiment, but for impulse operation with two exhaust pipes 6, is shown in FIG. 11, in which the bypass line continues downstream from the non-return valve 30 in the form of two bypass lines 32 and 33, one of each exhaust pipe. These bypass lines should possess the smallest possible volume.

The rapid-acting non-return valve 30 is a conventional laminated spring valve, also known as a laminated valve, having very resilient strip-shaped laminated springs 34 which are restrained at one end and extend perpendicularly to the plane of the sheet of drawing over the total valve cross-section, to form shutoff members of the valve, which are opened and closed by the pressure difference across the valve. In their closed state the laminated springs 34 assume a flat nondeformed shape, and in their open state, they lie against their curved stop 35.

Figure 15:
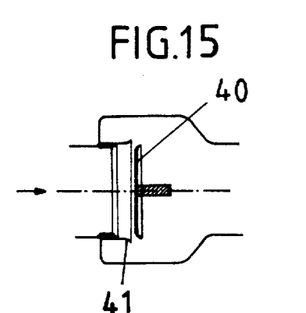

Further conventional valve designs which are suitable for use as the rapid-acting non-return valve are, inter alia, perforated plate valves, annular plate valves and turret valves of the type used for compressors. Those valves are of low mass and small maximum lift, require no damping and can therefore synchronously follow the rapid pulsations occurring between the individual exhaust and intake pulses. Such a valve can either be combined with the bypass valve into a block as in the case of the slow-acting non-return valve (FIG. 15), or can be disposed separate therefrom in the bypass line (FIGS. 10, 11).

The type of non-return valve and the arrangement of the bypass valve are selected to produce constant pressure operation by the pressure differences $p_V-p_T$ between the compressor outlet and turbine inlet, which during partial output can become temporarily negative due to the always present pulsations, although the average value $p_{Vm}-p_{Tm}$ is positive. By disposing a rapid-acting non-return valve at the required position in the bypass line, no exhaust gas can be forced into the throttle member or compressor air line during negative pressure difference, and thus no soiling or overheating can be caused. In order to prevent such problems with a slow-acting non-return valve, the non-return valve (which forms a control block 18 with the throttle member (see FIG. 5)) must be disposed directly at the air bleed point, and the volume of the connecting bypass line must be made so large that for any gas overpressure, which the slow-acting non-return valve is unable to follow, exhaust gas cannot penetrate into the bypass. By means of a grid in the bypass line, such an undesirable overflow can be relatively prevented so as to prevent a tongue of gas from shooting forward.

Figures 12, 12A:
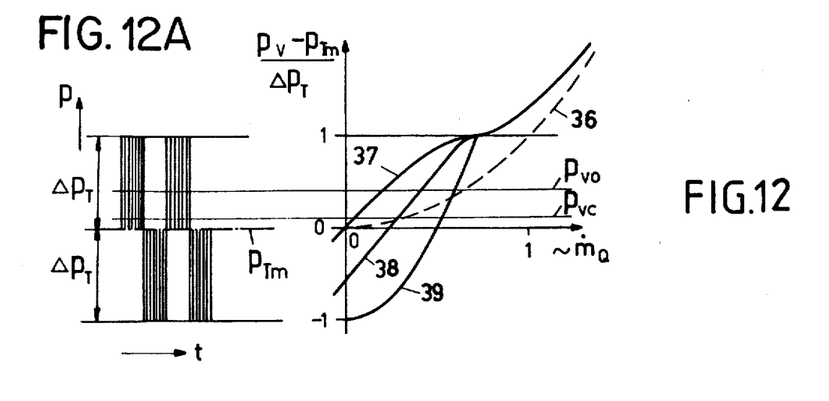
FIG. 12 is a diagram of the pressure fluctuations before the turbine.
FIG. 12A is a diagram showing the throughput through various throttle members for small pressure fluctuations.

In addition, the throttle members are so constructed that the overflow in the reverse direction, i.e., from the exhaust line 6 in the direction of the compressor air line, is hindered in spite of full opening. Some designs of such throttle members are described hereinafter with reference to FIGS. 13 to 17. However, a description of the influence of comparatively small pressure fluctuations on the flow through a throttle member will firstly be given with reference to FIGS. 12 and 12A. FIG. 12A shows in idealized form for an assumed constant $p_V$, the variation with time of such pressure pulses on the offgas side. FIG. 12 shows the flow $m_Q$ through the throttle member as a function of $(p_V-p_{Tm})/\lambda p_T$, i.e., of the pressure difference $p_V-p_{Tm}$ relative to the rapid pressure fluctuation $\lambda p_T$, where $p_{Tm}$ is the average pressure at the turbine inlet. The dashed curve 36 in FIG. 12 shows the variation of the throughput flow $m_Q$ without pressure fluctuations, and the curve 37 shows such throughput at the same discharge coefficient for both flow directions. The curve 38 is valid for a throttle member, i.e., a borda valve (see below) of which the throughput for reverse flow is only half as large as for the bypass flow from the compressor to the turbine, and the curve 39 is valid for a ideal rapid-acting non-return valve. Even for a negative value of $p_V-p_{Tm}$, a positive flow, i.e., a conveying action, is obtained with the valves for which the curves 38 and 39 are valid.

Figure 13:
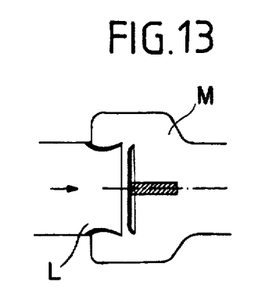
FIGS. 13-17 show various designs of throttle members with impeded return flow which, mainly in the case of constant pressure operation with an always present small pressure fluctuations, take on the function of a rapid-acting non-return valve.

FIGS. 13 to 17 are diagrammatic illustrations of some such throttle members with impeded return flow. FIG. 13 shows a conventional valve operating under the known borda principles, i.e., a valve in which a passage L of one cross-sectional area communicates with a passage M of a larger cross-sectional area so that fluid in the smaller passage L is faster than that in the larger passage M. The valve opens toward the turbine side, and has the disadvantage of leaking for small pressure fluctuations which cause a slight lifting from its seat. The inserted valve shown in FIG. 15, which also operates under the borda principle substantially obviates this drawback, as the periphery of a valve plate 40 sits fairly tightly in a cylindrical collar 41 when closed, and emerges from the collar only in response to larger forces, to create through flow.

Figure 14:
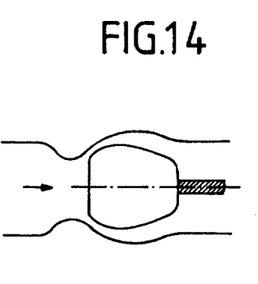
Figure 16:
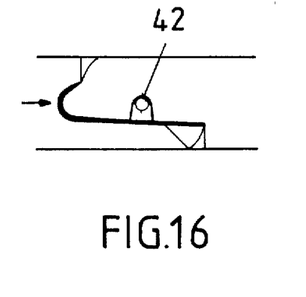
Figure 17:
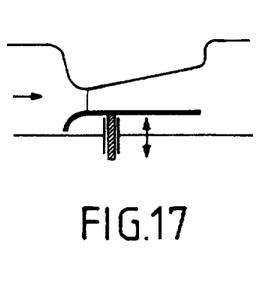

FIG. 14 shows a diffuser valve, and FIG. 17 a diffuser vane. In FIG. 17, the closure movement is in the direction of the double arrow, transversely to the flow direction. FIG. 16 shows a flap valve, operating under the borda principle, in which rotation of the spindle 42 causes the flap to rotate and restrict the flow area of the passage.

Figure 18:
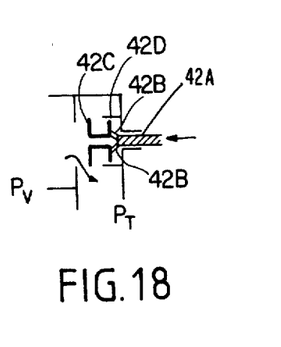
FIG. 18 is a diagrammatic illustration of a force-free throttle member.

The throttle member shown in FIG. 18 is an example of a balanced force-free valve in which relatively small forces act on a connection rod 42A between the piston and throttle member because of balance bores 42B in the valve 42C which admit pressure $p_V$ into the casing 42D in which the valve 42C travels, thereby equalizing pressure in front of and behind the valve.

Figure 19:
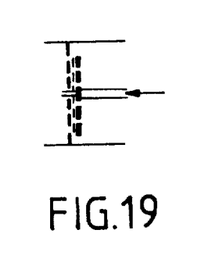
FIG. 19 is a plate valve with pump action acting as a throttle member.

The throttle member shown in FIG. 19 is an annular plate valve, a preferably used design, in which the light valve body assumes the function of a quick-acting non-return valve. A practical embodiment of a valve of this design is described in greater detail hereinafter with reference to FIG. 22.

Figure 20:
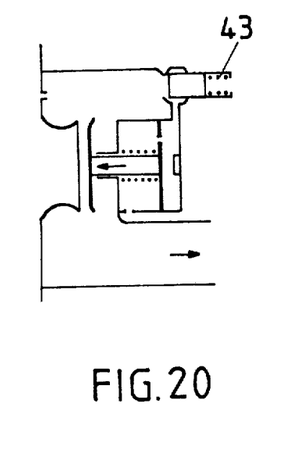
FIGS. 20 and 21 are diagrammatic illustrations of two embodiments of a bypass valve.
Figure 21:
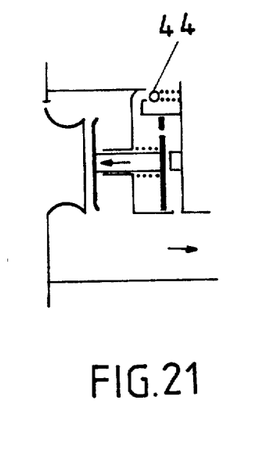

FIGS. 20 and 21 show two modifications of bypass valves with a control slide valve 43 and pressure maintaining valve 44, respectively. A description of two such designs is given hereinafter with reference to the embodiments shown in FIGS. 23 and 24.

Figure 22:
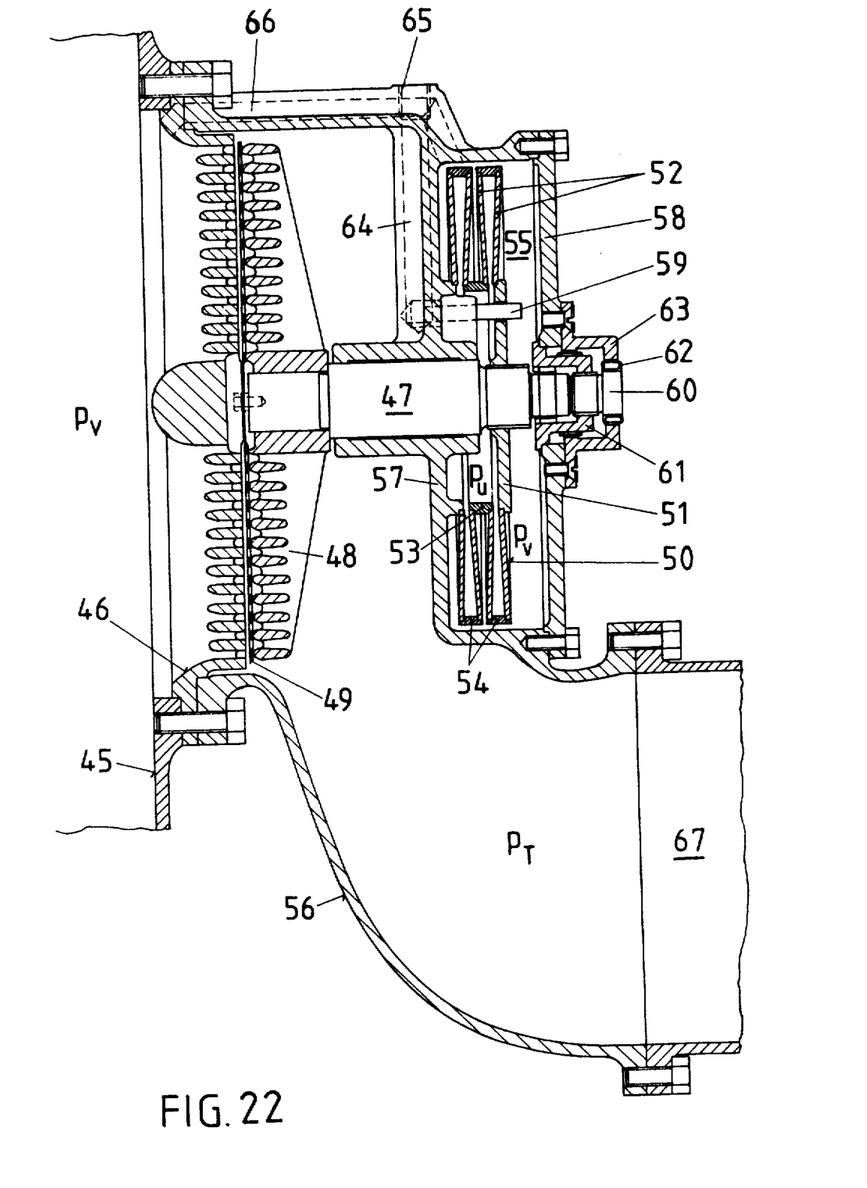
FIGS. 22-24 illustrate three different embodiments of an automatic bypass valve according to the invention.

In the embodiment of a bypass valve shown in FIG. 22, the throttle member is an annular plate valve with a valve base plate 46 screwed tightly onto the air intake manifold 45. An axially movable valve support plate 48 is fixed on a piston rod 47. An axially movable annular plate 49 sits between the base plate 46 and support plate 48 and acts as a shut-off member for the valve. On the other end of the piston rod 47 there is an actuating piston 50 composed of a piston head plate 51 screwed onto the end of the piston rod 47, flat springs 52, an inner space ring 53, and two outer spacer rings 54. By means of this construction, the piston 50 simultaneously assumes the function of a spring, which eliminates the need for a separate spring element.

The piston 50 is located in a cylindrical space 55 in the valve housing 56, which space is bounded in the axial directions by an intermediate wall 57 and a housing cover 58. The compressor end of the piston 50 is supported on the intermediate wall 57, whereas the other end of the piston is fixed via its head plate 51, to the piston rod 47. The piston 50 is prevented from rotating by a bolt 59 extending through the intermediate wall 57 and the head plate 51. The piston stroke is limited axially by an adjustment screw 60 disposed at the right hand end of the piston rod, and screwable into an adjustment sleeve 61 disposed in the housing cover 58. An adjustment screw comprises toothing 62 on its head, by means of which the respective set position of the screw 60 can be fixed. For this purpose, there is provided a safety cap 63 which can be firmly secured by screws to the housing cover 58 and which comprises internal toothing corresponding to the toothing 62.

The adjustment sleeve 61 sits on the end of the piston rod, the latter end being in the form of a splined shaft, and serves for adjusting the spring preloading. That is, by rotating the adjustment sleeve, the piston head plate 51 is slid axially. When installed, the safety cap 63 also prevents the adjustment sleeve from turning.

In the intermediate wall 57 there is a channel 64 which connects the space inside the piston to atmosphere, and includes a threaded bore 65 at its outlet from the housing 56. This bore is for connecting a line, not shown, comprising a shutoff member, which serves for switch-over to the already previously mentioned "special operation", which will be described in greater detail during the description of the operation of the valve.

A second channel 66 connects the space 55 outside the piston to the air intake manifold 45.

A bypass line 67 connects the valve housing 56 to the bypass connection on the turbine side. The operation of this valve is described hereinafter with reference to the diagrams of FIGS. 3 and 4.

The charge air pressure $p_v$ acts on the actuating piston 50 through the plate 49, and is also present in the space 55 by way of the channel 66. For a small $p_v$, i.e., for low load, the spring force of the piston dominates, and the piston rod lies against the right hand stop, so that the valve is open (If $p_T > p_v$, then the axially freely movable plate 49 closes; however, this behavior is generally only for the case of very small values of $p_v$ or for pulsating pressures, on which the conveying action mentioned in the background is based.) This operational state corresponds to the portion edc of the operating line. On reaching the pressure $p_v$ corresponding to point c, the resilient actuating piston 50 is compressed, and the valve forcibly begins its closure movement, which finishes on reaching point b. It remains closed until point a is reached.

By means of the adjustment screw 60, the extent of valve unseating and thus the position of the portion dc of the operating line, can be varied. The amount of spring preload and thus the position of the portion cb can be varied by means of the adjustment sleeve 61.

In determining the transition curve cb, allowance must be made both for the flow force on the shutoff member of the valve, which varies with the valve lift, and also for the spring characteristics.

This design of the bypass valve, in which the actuating piston is disposed downstream of the throttle member 46, 49, is based on the requirement that the unit should be able to be mounted directly on the air intake manifold upstream of the charge air cooler, and the adjustment members 60 and 61 must be accessible without hindrance.

The annular plate valve used here as the throttle member has the advantage that it requires only a very small unseating movement so that pistons with corrugated tube springs, diaphragm springs or, as in the present case, cup springs can be used, wherein leakage to the surrounding is very small.

In the case of the initially mentioned special operation, the valve must remain temporarily open under full load, for which purpose a line with a shutoff member is screwed into the threaded bore 65 of the channel 64. When the shutoff member is closed, then even if the degree of leakage of the compound piston 50 is a minimum, the same pressure is present inside this latter as in the space 55, so that the spring force holds the valve open. If the degree of leakage of a piston deriving from constructional considerations is not sufficient for this purpose, then a small opening must be made for this in the head plate.

For the exhaust systems shown in FIGS. 5-9, this valve embodiment of FIG. 22 requires no additional non-return valve in the bypass line, as the annular plate 49 acting as the shutoff member acts as a rapid-acting non-return valve because of its small mass.

However, as initially stated, for pure impulse operation, additional rapid-acting non-return valves disposed as close as possible to the exhaust line are necessary, because otherwise the pulse energy of the exhaust gas is dissipated without utilization in the bypass line. This is also true for the two embodiments described hereinafter.

Figure 23:
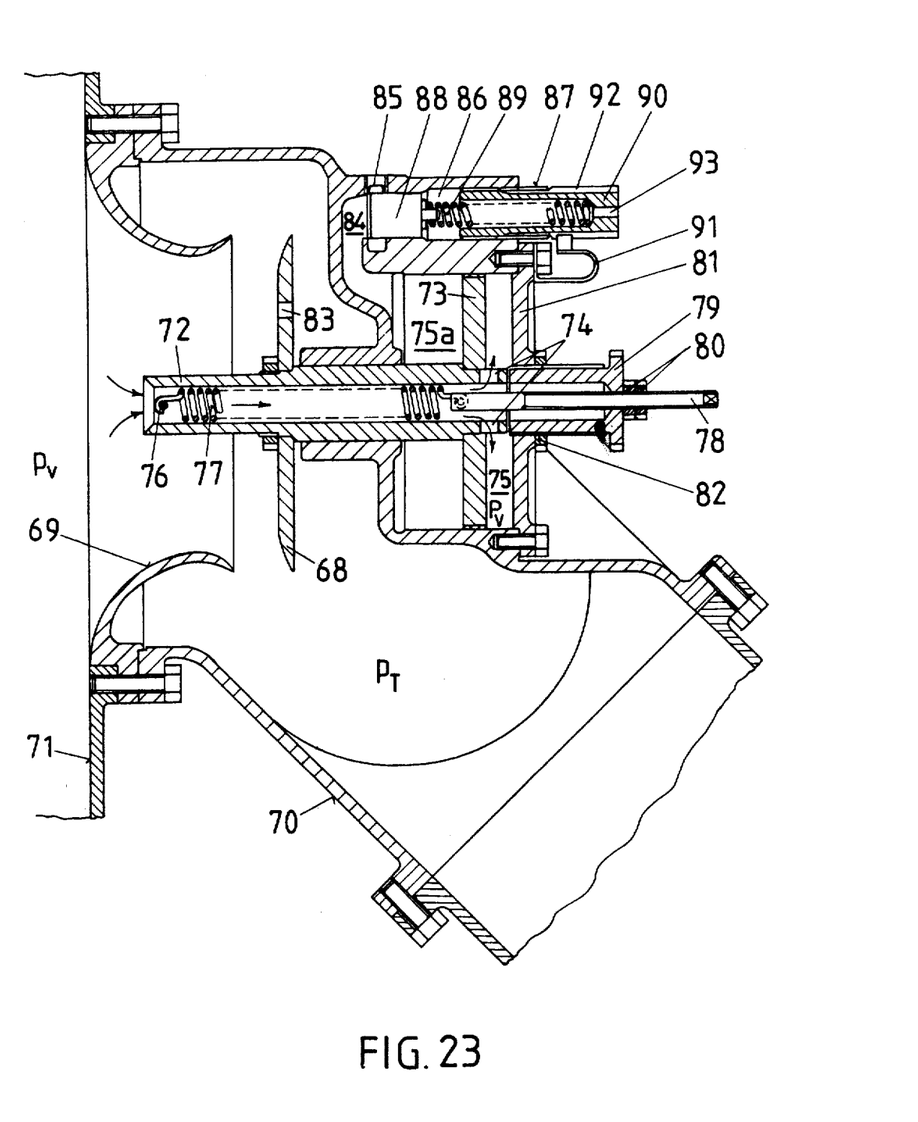

In the embodiment shown in FIG. 23, the throttle member is in the form of a valve, operating under the borda principle, composed of a valve disc 68 and an inlet collar 69, which together with the valve housing 70 is bolted to the air inlet manifold 71. The valve disc 68 is fixed onto a hollow piston rod 72, which behind its actuating piston 73, is provided with transverse bores 74, so that the air intake manifold is connected to a cylinder space 75 behind the piston. The hollow piston rod with the transverse bores 74 thus assumes the function of the channels 66 of the embodiment shown in FIG. 22.

A weak spiral tension spring 77 is fixed to a pin 76 inside the piston rod 72, and its other end is fixed to a threaded adjustment spindle 78. This spindle passes through an adjustment bush 79 and serves for setting the required preload in the spring 77 for fixing the portion de of the operating line (FIGS. 3 and 4) by means of two nuts 80, which are supported on the bush 79. By means of the adjustment bush 79, the required limit of the unseating of the borda valve and thus the position of the portion cd of the operating line can be set. For this purpose, it is screwable into the housing cover 81, and is fixed in the set position by a nut 82.

The valve disc 68 includes a throttle bore 83, the purpose of which is to continuously allow some charge air to penetrate into the valve space even when the valve is closed under full load, in order to make-up for leakage and to prevent the exhaust gas from flowing through the bypass line to the valve. In order to prevent exhaust gas reaching the charge air when $p_T > p_v$, this throttle bore can be provided with a non-return valve.

The cylinder space 75a in front of the piston 73 is connected via a channel 84 to a threaded bore 85, which as in the case of the embodiment shown in FIG. 22 is provided for connection of a shutoff member for special operation, and is normally connected to the surroundings. The valve space 86 contains a pressure maintaining valve 87, comprising a valve piston 88, a spiral compression spring 89 and an adjustment sleeve 90 for adjusting the spring preload, in order to vary the portion bc of the operating line.

A resilient safety strap 91 is provided for fixing the adjustment sleeve 90, and engages in one of the longitudinal grooves 94 in the periphery of the sleeve. The valve space 86 is connected to atmosphere by way of a bore 93 in the base of the sleeve 90.

When $p_v$ is small, the same pressure is present on both sides of the actuating piston 73 because of its leakage effect, the pressure maintaining valve 87 being closed because of the predominance of the spring force. Under these circumstances, only the pressure difference $p_v-p_T$ and the weak force of the spring 77 act on the valve disc 68. If $p_v-p_T$ is only slightly negative on average, then the spring holds the valve open and under pulsating pressures the described conveying action of the valve is obtained. In contrast, if $p_v-p_T$ is strongly negative, then the valve disc 68 is forcibly closed and thus acts as a slow-acting non-return valve responding to long-duration pressure differences. As already stated, in this case the flow through such a borda valve in the reverse flow direction, i.e., from the turbine to the compressor, under otherwise equal conditions is only about half as great as in the direction from the compressor to the turbine.

By suitably dimensioning the cross-section of the channels 84 and 74 and minimizing the cylinder spaces 75 and 75a, the impact velocity of the valve disc 68 can be braked.

If the charge air pressure rises, the valve piston 88, opens the annular channel 85 against the resistance of the spring 89. Thus, the cylinder space 75a communicates with atmosphere, so that the pressure in the space 75a remains constant as $p_v$ continues to rise. When the pressure $p_v$ corresponding to point c on the operating line is attained, the force on the actuating piston 73 dominates the force on the valve disc 68 due to $p_v-p_T$ and the force of spring 77, and the valve begins its closure movement, which comes to an end on reaching the charge pressure corresponding to point b on the operating line.

Special operation is accomplished in the same manner as for the embodiment of FIG. 22.

Figure 24:
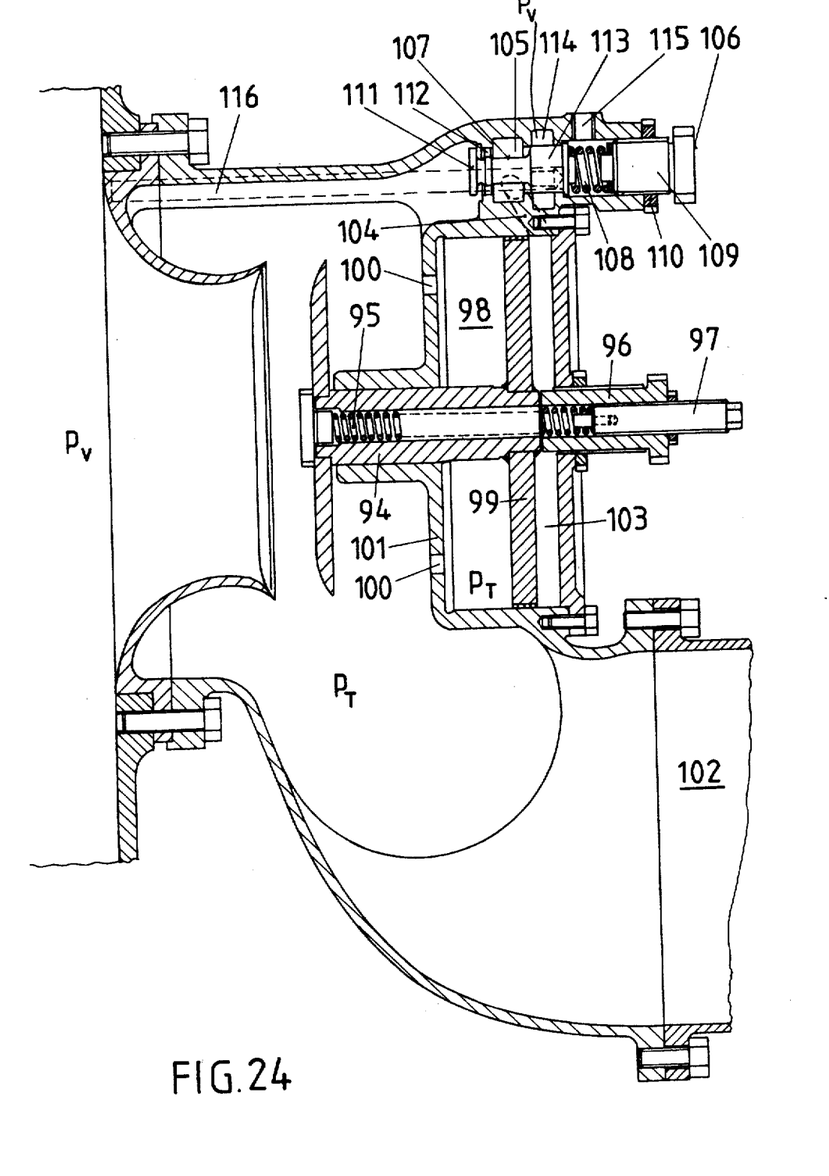

The embodiment shown in FIG. 24 likewise comprises as its throttle member (a valve operating under the borda principle), but in contrast to the embodiment of FIG. 23 the spring inside the piston rod 94 is a spiral compression spring 95, the preload of which can be varied by a threaded adjustment spindle 97 screwable into an adjustment bush 96. This latter spindle serves for varying the portion de of the operating line, and the bush 96 serves for adjusting the portion cd. The cylinder space 98 on the compressor side of the actuating piston 99 is connected via bores 100 in the cylinder base 101 with the bypass line 102, so that the pressure $p_T$ can be adjusted in the space 98.

The cylinder space 103 on the turbine side is connected via a channel 104 to an annular space 105 in a control valve 106. This latter consists of a piston valve 107, a compression spring 108, an adjustment screw screwable into the valve housing and a nut 110 for locking the adjustment screw. The position of the portion bc of the operating line can be varied by means of the adjustment screw. The free end of the piston valve comprises a disc 111 which can extend into a corresponding bore 112 in the valve housing, in order to shut off the connection between the annular channel 105 and bypass line. The valve surface 113 of the piston valve is surrounded by a further annular space 114, which can be either shut off from the annular space 105 or connected to it by means of the control edge of the valve surface 113. For special operation, the space behind the piston valve, in which the spring 108 is located, can be connected to atmosphere, to the charge air intake manifold or to a point at which the turbine inlet pressure $p_T$ is present, by way of a line, not shown, containing a three-way cock and screwable into the screwed bore 115.

A channel 116 is provided in the housing for connecting the charge air intake manifold to the annular space 114.

For a small $p_v$ value, the valve of this embodiment is kept closed by the spring 95. No force then acts on the piston 99, as the pressure $p_T$ is present in the cylinder space 98 because of the bores 100 present in the cylinder base 101, this pressure having been also attained in the cylinder space 103 by way of the annular space 105 and channel 104, as the control valve is open against the pressure $p_T$. Thus, only the pressure difference $p_v-p_T$ and the weak shutting force of the spring 95 act on the valve disc.

If $p_v-p_T$ is only slightly positive on average, then the spring 95 keeps the valve closed. For a larger positive pressure difference, the valve disc is forced against the weak resistance of the spring 95. If the charge air pressure rises further, the valve opens completely, and remains open in the range dc of the operating line, as in this range the same pressure is present in the spaces 98 and 103 on both sides of the actuating piston 99, on the one hand because of the connection of the space 103 to the bypass line by way of the channel 104 and the annular space 104 when the control valve is still open.

Even before reaching the charge pressure $p_v$ corresponding to point c on the operating line, the pressure $p_T$ begins to slide the piston valve 107 towards the right against the resistance of the spring 108, by which the connection of the annular space 105 to the bypass line is interrupted, and the annular spaces 105 and 114 become connected together. By this means, the charge air pressure $p_v$ acts in the cylinder space 103 by way of the channel 104, so that on reaching the operating point c, the piston 99, the surface area of which is greater than that of the valve disc, begins to close this latter. The valve is then completely closed before reaching full load at point b.

During the described normal operation, the threaded bore 115 is connected to atmosphere.

For short-duration special operation, the valve can also be kept open during full load by connecting the bore 115 to a point at which $p_v$ or $p_T$ is present, in that by this means the piston valve is slid towards the left as far as its stop by means of the spring 108, so that the pressure $p_T$ reaches the cylinder space 103, and the piston 99 becomes force-free, due to the fact that the pressure $p_T$ is also present in the cylinder space 98.

Although the invention has been described in connection with a preferred embodiment thereof, it will be appreciated by those skilled in the art that additions, modifications, deletions and substitutions not specifically described may be made without departing from the spirit and scope of the present invention as defined in the appended claims.

What is claimed is:

1. In an internal combustion engine of the type having a turbocharger compressor connected to an engine charge air intake manifold and a waste gas turbine connected to an engine waste gas manifold, an automatic bypass including a bypass line interconnecting, firstly, said waste gas manifold upstream of the waste gas turbine and, secondly, said air intake manifold downstream of said compressor, and bypass valve means in said bypass line comprising a valve seat, an adjustable valve body defining with said seat a throttle member for adapting the quantity of bypassed gas to the prevailing operating state of the engine, a movable piston rod having a first end adjacent said air intake manifold and to which said valve body is connected, and an actuating piston operably connected to said piston rod and responsive to pressures in the bypass line for moving said valve body, the improvement wherein:

said piston rod includes a second end remote from said air intake manifold, said actuating piston disposed on said second end, said throttle means defining means for resisting gas flow from the compressor side to the turbine side substantially less than from the turbine side to the compressor side, said valve body being urged to an open condition when the pressure at said compressor side of said bypass valve is within a range below a selected pressure value under load conditions and above a pressure value existing under conditions of engine idling, means for communicating said actuating piston with the pressure at said compressor side of said bypass line to move said valve body from a valve open position to a valve closed position in response to pressures above said selected value at said compressor side, an adjustable stop element provided for adjustably limiting the stroke of said valve body in a valve opening direction, said valve body disposed in engagement with said valve seat in said valve closed position, said piston rod being hollow and including transverse bores for connecting the charge air intake manifold with a space behind said actuating piston, a spring for urging said valve body open, said spring comprising a helical tension spring, one end of said spring connected to said piston rod, and another end of said spring fixed to a threaded element operably connected to said spring and being adjustable to vary the prestress of said spring, said threaded element comprising a threaded spindle, a threaded bushing mounted for adjustment along the axis of said piston rod, a first nut threadedly mounted on said bushing to locate the latter, said spindle extending through said bushing, a second nut threadedly mounted on said spindle and abutting said bushing to locate said spindle, said bushing defining said stop element for limiting the stroke of said valve body.

2. Apparatus according to claim 1 including a passage communicating the front of said actuating piston with the ambient surroundings, a secondary piston movably mounted to extend into said passage to block same, a helical compression spring yieldably urging said secondary piston into said passage, and means for varying the prestress on said last-named spring, said secondary piston being urged out of said passage as said actuating piston is moved toward a valve closing position.

* * * * *